(12) United States Patent
Zavesky et al.

(10) Patent No.: US 11,040,290 B2
(45) Date of Patent: Jun. 22, 2021

(54) NETWORK-CONTROLLABLE PHYSICAL RESOURCES FOR SENSORY SERVICE

(71) Applicant: AT&T Intellectual Property I, L.P., Atlanta, GA (US)

(72) Inventors: Eric Zavesky, Austin, TX (US); David Crawford Gibbon, Lincroft, NJ (US); Raghuraman Gopalan, Dublin, CA (US); Bernard S. Renger, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 33 days.

(21) Appl. No.: 16/015,998

(22) Filed: Jun. 22, 2018

(65) Prior Publication Data

US 2019/0388794 A1 Dec. 26, 2019

(51) Int. Cl.
*G05B 19/042* (2006.01)
*A63G 31/00* (2006.01)
(Continued)

(52) U.S. Cl.
CPC ....... *A63G 31/007* (2013.01); *G05B 19/0428* (2013.01); *G06F 3/015* (2013.01);
(Continued)

(58) Field of Classification Search
CPC .............. A63G 31/007; G05B 19/0428; G05B 2219/24024; G05B 2219/24162; G06F 3/015; G06F 3/24024; H04W 4/38
(Continued)

(56) References Cited

U.S. PATENT DOCUMENTS

| 7,602,301 | B1 | 10/2009 | Stirling et al. |
| 8,257,228 | B2 | 9/2012 | Quatrochi et al. |

(Continued)

FOREIGN PATENT DOCUMENTS

| WO | 2012135325 A2 | 4/2014 |
| WO | 2015131065 A1 | 9/2015 |

OTHER PUBLICATIONS

Shen, Bo, and Jun-Song Fu. "A method of data aggregation for wearable sensor systems." Sensors 161 (2016): 954. https://www.ncbi.nlm.nih.gov/pmc/articles/PMC4970008/.
(Continued)

*Primary Examiner* — Rocio Del Mar Perez-Velez
*Assistant Examiner* — Alicia M. Choi

(57) ABSTRACT

Methods, computer-readable media, and apparatuses for adjusting a network-controllable physical resource of a sensory service in response to biometric data for a group of users are disclosed. In one example, a processing system including at least one processor may gather biometric data of each user of a group of users of a sensory service. The sensory service may comprise at least one network-controllable physical resource. The processing system may then aggregate the biometric data for the group of users and tailor the sensory service for the group of users based upon the biometric data for the group of users that is aggregated. In one example, the tailoring of the sensory service may include adjusting the at least one network-controllable physical resource in response to the biometric data that is aggregated for the group of users.

20 Claims, 3 Drawing Sheets

(51) Int. Cl.
*G06F 3/01* (2006.01)
*H04W 4/38* (2018.01)

(52) U.S. Cl.
CPC .............. *G05B 2219/24024* (2013.01); *G05B 2219/24162* (2013.01); *H04W 4/38* (2018.02)

(58) Field of Classification Search
USPC ......................................................... 700/275
See application file for complete search history.

(56) References Cited

U.S. PATENT DOCUMENTS

| | | | |
|---|---|---|---|
| 8,358,214 B2 | 1/2013 | Amigo et al. | |
| 8,589,174 B2 | 11/2013 | Nelson et al. | |
| 9,030,294 B2 | 5/2015 | Mollicone et al. | |
| 9,135,805 B2 | 9/2015 | Freedman et al. | |
| 9,308,417 B2 | 4/2016 | Grundy | |
| 9,582,833 B2 | 2/2017 | Amigo et al. | |
| 9,655,548 B2 | 5/2017 | Hong et al. | |
| 9,669,254 B2 | 6/2017 | Arredondo | |
| 9,724,588 B1 | 8/2017 | Cronin et al. | |
| 9,734,304 B2 | 8/2017 | Blackadar et al. | |
| 9,870,716 B1 | 1/2018 | Rao et al. | |
| 9,947,198 B2 | 4/2018 | Albinali | |
| 2007/0106484 A1* | 5/2007 | Sweatman | A63G 7/00 702/188 |
| 2009/0270743 A1 | 10/2009 | Dugan et al. | |
| 2010/0257601 A1* | 10/2010 | Bolyukh | G06F 21/32 726/16 |
| 2014/0222454 A1* | 8/2014 | Duffy | G06F 19/3475 705/2 |
| 2015/0025917 A1 | 1/2015 | Stempora | |
| 2015/0199484 A1 | 7/2015 | Morris et al. | |
| 2015/0248651 A1* | 9/2015 | Akutagawa | G06Q 10/1095 705/7.19 |
| 2016/0034663 A1 | 2/2016 | Nino et al. | |
| 2016/0091872 A1* | 3/2016 | Marti | H04L 12/4625 700/275 |
| 2016/0091877 A1* | 3/2016 | Fullam | G05B 15/02 700/276 |
| 2016/0184706 A1* | 6/2016 | Muller | A63F 13/45 463/42 |
| 2017/0000386 A1 | 1/2017 | Salamatian et al. | |
| 2017/0021282 A1* | 1/2017 | Comploi | B60W 50/10 |
| 2017/0070842 A1* | 3/2017 | Kulp | H04W 4/021 |
| 2017/0109829 A1 | 4/2017 | Amigo et al. | |
| 2017/0180336 A1* | 6/2017 | Josephson | H04L 63/06 |
| 2017/0193705 A1* | 7/2017 | Mullins | G06T 19/006 |
| 2017/0224214 A1 | 8/2017 | Saigh et al. | |
| 2017/0225032 A1 | 8/2017 | Jones | |
| 2017/0245806 A1 | 8/2017 | Elhaway et al. | |
| 2017/0347899 A1 | 12/2017 | Shushan et al. | |
| 2018/0014735 A1* | 1/2018 | Otsuka | A61B 5/0082 |
| 2018/0043211 A1 | 2/2018 | Mohrman et al. | |
| 2018/0082304 A1 | 3/2018 | Summerlin et al. | |

OTHER PUBLICATIONS

Jones, Kendall. "Wearables Are Helping Make Construction Sites Safer." Construct Connect®, constructconnect.corn, Jul. 21, 2017. http://www.constructconnect/com:80/blog/construction-technology/wearableshelping-make-construction-sites-safer/.
Akavia,Lior. "PPE and the Internet of Things." EHS Today®, ehstoday.com, Apr. 4, 2017. http://www.ehstoday.com/eye-face-head/ppe-and-internet-things.

* cited by examiner

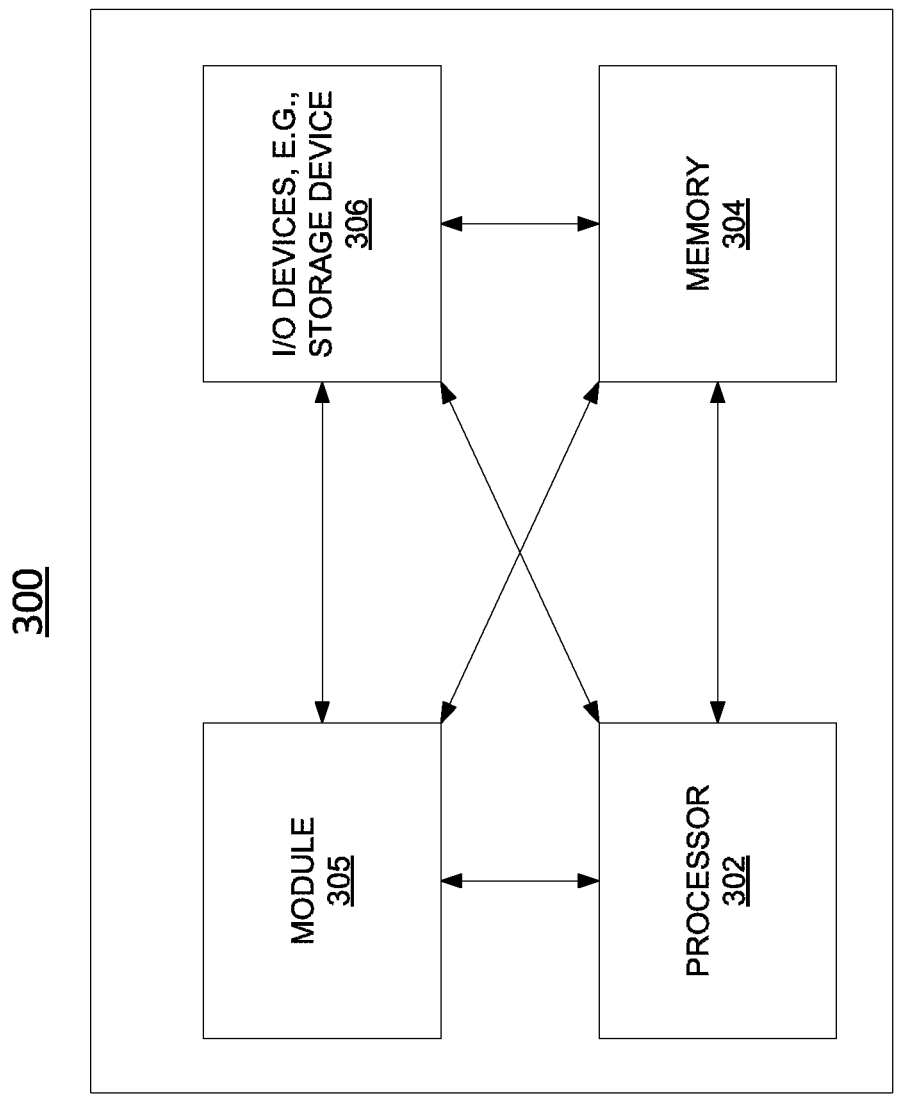

NETWORK-CONTROLLABLE PHYSICAL RESOURCES FOR SENSORY SERVICE

The present disclosure relates to sensory services, such as entertainment rides, and more particularly to devices, computer-readable media, and methods for adjusting a network-controllable physical resource of a sensory service in response to biometric data for a group of users.

BRIEF DESCRIPTION OF THE DRAWINGS

The teachings of the present disclosure can be readily understood by considering the following detailed description in conjunction with the accompanying drawings, in which:

FIG. 3 illustrates a high-level block diagram of a computing device specially programmed to perform the functions described herein.

To facilitate understanding, identical reference numerals have been used, where possible, to designate identical elements that are common to the figures.

DETAILED DESCRIPTION

Figure 1:
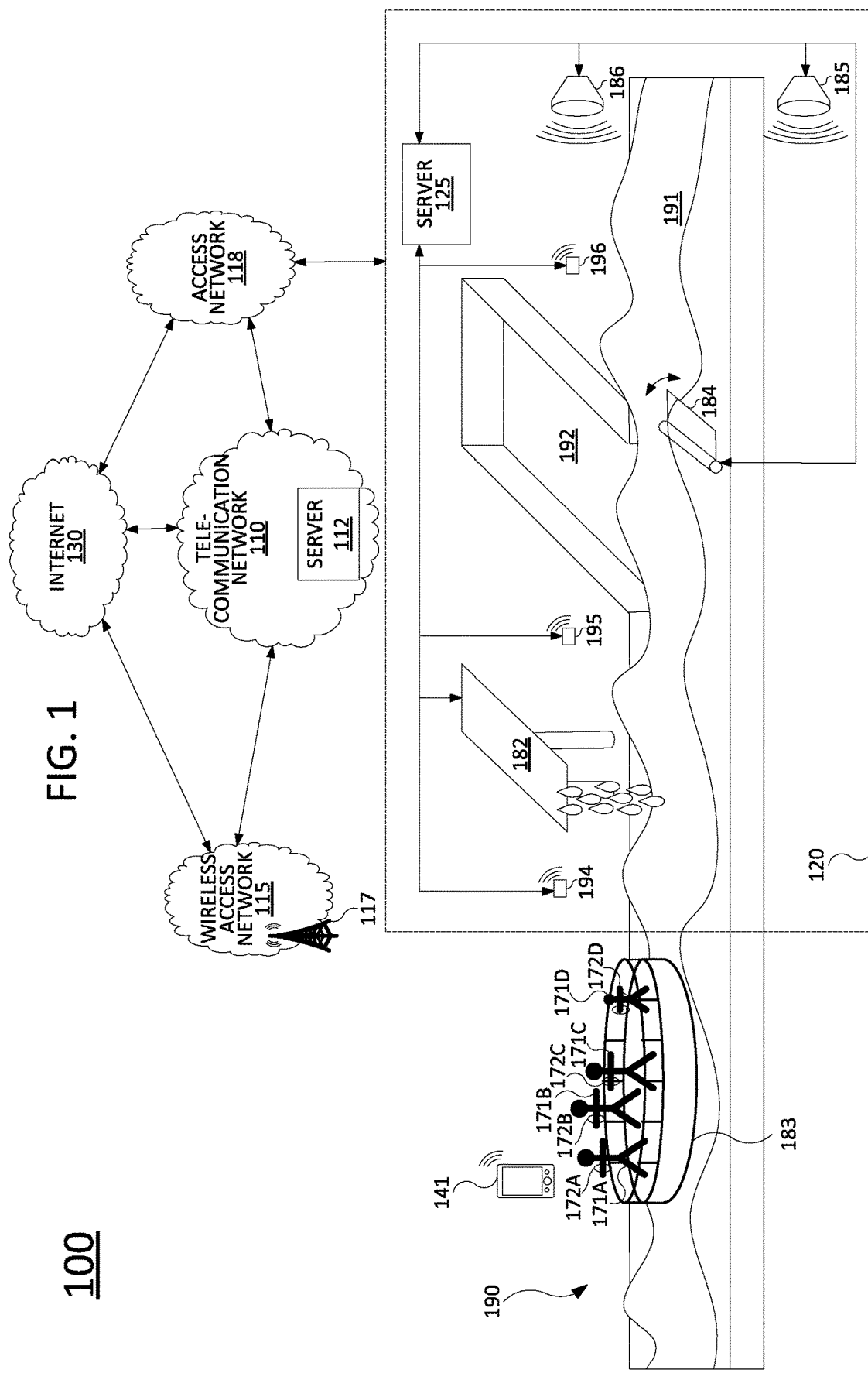
FIG. 1 illustrates an example system related to the present disclosure.

The present disclosure broadly discloses devices, non-transitory (i.e., tangible or physical) computer-readable storage media, and methods for adjusting a network-controllable physical resource of a sensory service in response to biometric data for a group of users. For instance, in one example, a processing system including at least one processor may gather biometric data of each user of a group of users of a sensory service. The sensory service may comprise at least one network-controllable physical resource. The processing system may then aggregate the biometric data for the group of users and tailor the sensory service for the group of users based upon the biometric data for the group of users that is aggregated. For example, the tailoring of the sensory service may comprise adjusting the at least one network-controllable physical resource in response to the biometric data (e.g., heart rate, blood pressure, breathing rate, body temperature, and so on) for the group of users.

In one example, the present disclosure may monitor a user's biometric data, learn aggregated levels over multiple users for a specific task, personalize an acceptable range of biometric data for each user in a group of users, and control one or more network-controllable physical resources to maintain each user within an acceptable range for a sensory service. In one example, the sensory service may comprise an entertainment ride or a virtual simulation with tactile inputs. For instance, the sensory service may comprise a roller coaster, a waterslide, a waterborne vehicle-based ride, an obstacle course, and so forth. In accordance with the present disclosure the sensory service may include at least one network-controllable physical resource, which may include a visual source, an audio source, a tactile source, or an olfactory source for a visual presentation, an audial presentation, a tactile presentation, or an olfactory presentation, respectively. For example, a visual presentation may be made via a display screen, via presentation of a physical item to one or more users, via the adjustment of one or more remotely controllable lights in an environment, and so forth. The visual presentation may be made to provide the sensation that the user is flying, falling, floating, crashing, riding, etc., to provide the sensation that the user is in danger, in flight, and so on. Similarly, an audial presentation may be made via a headset, a speaker, a musical instrument, or other noise sources (such as banging pipes, knocking wood, etc.). An audial presentation may also include recorded or machine-generated speech, or other sounds to provide various sensations, such as being in a race car, being in a hurricane or thunderstorm, being chased by a person or other creatures, and so forth. A tactile presentation may comprise tactile inputs simulating one or more tactile sensations, e.g., a bump, a turn, or a diversion on a ride, a spray of water or air, and so forth. In addition, an olfactory presentation may include a puff or spray from a reservoir containing a scent agent, e.g., to create a pleasant or unpleasant smell for a user, to suggest the presence of a particular type of food, plant, or animal, or being in a particular environment, e.g., smoke associated with a burning building, buttery aromas associated with a bakery or a kitchen, etc.

In one example, users may have wearable devices with biometric sensors. The biometric sensors may measure biometric data such as a heart rate, a breathing rate, a skin conductance, a stride length, a weight lifted, a jump height, and so forth. The wearable devices may push biometric data to a network-based processing system or may respond to queries from the network-based processing system for biometric data. The wearable devices may provide any biometric data that such devices are able to collect and/or the respective users are willing to provide to the network-based processing system. In one example, the network-based processing system may store the biometric data on behalf of users and respond to queries for biometric data from one or more sensory service provider systems. For example, a sensory service provider system may query the network-based processing system to determine whether a user's or a group of users' biometrics data is/are within an acceptable range for a sensory service. In one example, the biometric data does not need to leave the network-based processing system. Rather, the network-based processing system may return a result of yes or no, or may provide a safe, healthy, and/or a typical range for a user or for a group of users. The sensory service provider system or the network-based processing system may determine that the user's or the users' biometrics are within an acceptable range for the sensory service. In addition, the sensory service provider system may provide different user experiences based upon the acceptable and current biometric ranges. For instance, a tamer experience may be provided for one biometric range and a more intense experience may be provided for another biometric range. In addition, in one example, a network-based processing system may coordinate with a sensory service provider system to make sure that users' biometrics do not go outside of acceptable ranges during a sensory service.

In one example, biometric data may be collected over many users and used to train anonymized acceptable ranges (e.g., safe and/or typical ranges) for a sensory service. Individual biometric data may also be used to personalize acceptable conditions for each user involved in a sensory service. For instance, the present disclosure may include verifying that a user is equipped to handle a task by comparing the user's personal biometrics against an acceptable range (or acceptable ranges for multiple aspects of the biometric data). In one example, the present disclosure may also personalize safe parameters of a sensory service for a user by starting with a more generic range associated with the sensory service, and then applying the user's typical biometrics to provide a more refined and personalized set of safe operating parameters.

In one example, qualification of a user for a sensory service may be based upon a user's prior history and known biometric ranges. In another example, qualification for a sensory service may be based upon biometric measurements that are taken just prior to the sensory service. For instance, a user may be prompted to perform one or more physical tasks, such as running 50 meters, performing 20 pushups, lifting a particular weight, jumping as high as possible, etc., and the biometric data may be captured during the performance (e.g., a time to complete the run, a height of the jump, a heart rate during the pushups, a maximum number of repetitions moving the weight, etc.). The biometric measurements may then be used to qualify the user for a sensory service. For instance, a user category may be inferred and a set of one or more acceptable ranges for biometric measurement(s) may be selected based upon users with similar running abilities, jumping abilities, etc. In one example, multiple qualifications may be applied to permit or prevent a user to participate in a sensory service, e.g., a demonstrated ability to swim a particular distance, to complete a run of a certain distance in a particular time, and/or to cycle a certain distance.

In one example, a provider of a sensory service may offer a customized set of experiences or tasks for a group of users based on the users' aggregated biometric data. For instance, based upon a user's biometric data compared to a range of acceptable parameters to participate in a sensory service, it may be determined that there is little or no health or safety risk. If a user's biometric data indicates that the user does not fall within an acceptable range for the sensory service, it may be suggested that the composition of the group of users be adjusted to exclude the user. Alternatively, or in addition, the sensory service may adjust at least one network-controllable physical resource of the sensory service in response to the biometric data for the group of users. For instance, the at least one network-controllable physical resource may be turned on or off, or may be adjusted to a particular level (e.g., high/medium/low/off, fast/medium/slow/off, loud/medium/quiet/off, bright/dim/off, and so forth).

In one example, an acceptable range for a biometric measure may be generalized for all users or certain categories of users. However, an acceptable range may also be further individualized to each user. For instance, a sensory service provider system may initially use a generic range based on a user category. However, the sensory service provider system may then adjust the baseline parameters based upon levels of information the user is willing to provide. For instance, if user provides his or her heart rate data, the system may adjust accordingly. If user shares breathing rate data, the system may adjust accordingly. Otherwise, the system may continue to assume an average acceptable range over all users. In addition, in one example, for a sensory service being provided for a group of users, a lowest common denominator among all of the users may be utilized, e.g., the most restrictive biometric level among all of the users; such as the user(s) in the highest heartrate category, the lowest weight lift category, the longest running time category, the highest breathing rate category, etc. In other words, the least capable biometric levels of a particular user will be used to constrain the experience of the entire group of users in which the particular user is a member of.

In one example, the present disclosure may create a new qualification requirement for a new sensory service by adapting the known acceptable biometric ranges from another similar sensory service. The new qualification requirement may also be adapted over time based on aggregated user experience and biometric measurements as users begin participating in the new sensory service. In one example, a "similarity" to an existing sensory service may be determined by first capturing biometrics of users participating in the new sensory service and then determining based upon biometrics which other sensory service(s) to which the new sensory service appears to be most similar. Biometric ranges for the known sensory service(s) may then be copied and used as permitted/acceptable ranges for the new sensory service. However, in one example, biometric data may continue to be collected as users participate in the new sensory service. Over time, the measured biometric data for the new sensory service may be used to replace, recalculate, and/or otherwise update the acceptable ranges that are implemented for the new sensory service. In one example, it may be determined that a new sensory service appears to be a hybrid of two existing sensory services (and/or an activity). For instance, a new sensory service may appear to be comprised of 30% running and 70% skiing. In such case, the acceptable ranges may be extrapolated from these respective known activities, e.g., by blending or averaging the acceptable ranges weighted based upon the percentage of similarity, and so forth.

As described above, in one example, a sensory service provider system may adjust one or more network-controllable physical resources to maintain each user within an acceptable range of biometric measurements. In one example, the adjustment to a network-controllable physical resource may be selected to affect one or more users' biometric measurements in a predetermined manner, e.g., to increase at least one biometric measurement, to decrease at least one biometric measurement, or to maintain at least one biometric measurement at a current value or within a given acceptable range. In one example, after the adjustment of the one or more network-controllable physical resources, the sensory service provider system may further determine whether the biometric measures of the one or more users were affected in the predetermined manner, e.g., as predicted based on the adjustments that were made.

In one example, the present disclosure may also provide automated recommendations to users for additional sensory services which may have similar biometric qualifications. In addition, examples of the present disclosure may provide automated recommendations to sensory services to create alternate experiences (e.g., menu items, objects or other physical stimuli within a ride, etc.). These and other aspects of the present disclosure are discussed in greater detail below in connection with the examples of FIGS. 1-3.

To aid in understanding the present disclosure, FIG. 1 illustrates an example system 100, related to the present disclosure. As shown in FIG. 1, the system 100 connects mobile device 141, biometric sensors 172A-172D, server 112, server 125, wireless access points 194-196, and network-controllable physical resources 182-186 with one another and with various other devices via a core network, e.g., a telecommunication network 110, a wireless access network 115 (e.g., a cellular network), an access network 118, and Internet 130. In the example of FIG. 1, a sensory service, e.g., a water rafting ride 190, may be associated with a sensory service provider network 120 which may include wireless access points 194-196, network-controllable physical resources 182-186, and server 125. The sensory service provider network 120 may comprise a Local Area Network (LAN), e.g., an Ethernet network, a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, or a combination of interconnected devices using a plurality of such communication modalities and protocols. The wireless access points 194-196 may comprise IEEE 802.11 (Wi-Fi) routers, IEEE 802.15 access points (e.g., "Bluetooth" access points, "ZigBee" access points, etc.), and so forth. The network-controllable physical resource 182 may comprise a controllable waterfall, e.g., where the flow of water can be turned on or off. The network-controllable physical resource 183 may comprise a raft which may include a propeller, a rudder, stabilizers, etc. (not shown). For instance, the raft may include a wireless transceiver and one or more electromechanical controllers to make adjustments to a motor connected to the propeller via a driveshaft, to the rudder, and/or to the stabilizers. The network-controllable physical resource 184 may comprise an underwater barrier than can be raised or lowered to impede or restrict the flow of water to waterway 191, to direct the raft 183 to either waterway 191 or waterway 192, and so on. The network-controllable physical resources 185 and 186 may comprise loudspeakers to provide audio outputs, for example.

In one example, the server 125 may comprise a computing system, such as computing system 300 depicted in FIG. 3, and may be configured to provide one or more functions for adjusting a network-controllable physical resource of a sensory service in response to biometric data for a group of users, in accordance with the present disclosure. For example, server 125 may be configured to perform one or more steps, functions, or operations in connection with the example method 200 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include a server 112. In one example, the server 112 may comprise a computing system, such as computing system 300 depicted in FIG. 3, and may be configured to provide one or more functions for adjusting a network-controllable physical resource of a sensory service in response to biometric data for a group of users, in accordance with the present disclosure. For example, server 112 may be configured to perform one or more steps, functions, or operations in connection with the example method 200 described below. For instance, server 112 may collect and store users' biometric data, may calculate acceptable ranges for various sensory services, may provide acceptable ranges for biometric measurements to sensory service providers, may confirm or deny that users are within acceptable ranges for various sensory services based upon the users' biometric data, and so forth. For ease of illustration, various additional elements of telecommunication network 110 are omitted from FIG. 1.

In one example, wireless access network 115 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 115 may comprise an access network in accordance with any "second generation" (2G), "third generation" (3G), "fourth generation" (4G), Long Term Evolution (LTE) or any other existing or yet to be developed future wireless/cellular network technology. While the present disclosure is not limited to any particular type of wireless access network, in the illustrative example, wireless access network 115 is shown as a UMTS terrestrial radio access network (UTRAN) subsystem. Thus, base station 117 may comprise a Node B or evolved Node B (eNodeB). As illustrated in FIG. 1, mobile device 141 may be in communication with base station 117, which provides connectivity between mobile device 141 and other endpoint devices within the system 100, various network-based devices, such as server 112, and so forth. In addition, in one example any one or more of biometric sensors 172A-172D may also be in communication with base station 117, e.g., where biometric sensors 172A-172D may also be equipped for cellular communication. In one example, wireless access network 115 may be operated by the same or a different service provider that is operating telecommunication network 110.

In one example, access network 118 may comprise a Digital Subscriber Line (DSL) network, a broadband cable access network, or the like. In one example, access network 118 may transmit and receive communications between sensory service provider network 120 and other devices in the system 100 relating to users' biometric data for the sensory service (e.g., server 112 in telecommunication network 110) in addition to voice telephone calls, communications with web servers via the Internet 130, telecommunication network 110, and/or wireless access network 115, and so forth.

Users 171A-171D may be associated with one another as a group of participants of the sensory service. For instance, users 171A-171D may be family members, e.g., parents and children, friends, co-workers, caregiver(s) and charge(s), individuals who are in successive positions in a line/queue for the ride 190, and so forth. In one example, each of the users 171A-171D may have at least one respective biometric sensor 172A-172D, e.g., a wearable device, which may capture biometric data of users 171A-171D respectively. In one example, biometric sensors 172A-172D may transmit the biometric data to server 112 and/or server 125 via a wireless connection to base station 117 and/or to one of wireless access points 194-196. The biometric data may also be routed through one or more intermediate networks, such as wireless access network 115, sensory service provider network 120, and/or access network 118. For instance, biometric sensors 172A-172D may include transceivers for IEEE 802.11 based communications, IEEE 802.15 based communications, and so forth.

The biometric sensors 172A-172D may include: heart rate monitors, electrocardiogram devices, acoustic sensors, sensors for measuring users' breathing rates, galvanic skin response (GSR) devices, portable electroencephalography (EEG) devices, event-related potential (ERP) measurement devices, diffuse optical tomography (DOT) scanners, and so forth. The biometric sensors 172A-172D may measure or capture data regarding various physical parameters of a user (broadly, "biometric data"). For instance, the biometric sensors 172A-172D may record the users' heart rates, breathing rates, skin conductance and/or sweat/skin moisture levels, temperature, blood pressure, voice pitch and tone, body movements, e.g., eye movements, hand movements, and so forth. In another example, the biometric sensors 172A-172D may measure brain activity, e.g., electrical activity, optical activity, chemical activity, etc., depending upon the type of biometric sensor. As illustrated in FIG. 1, users 171A-171D appear to have one biometric sensor apiece. However, it should be understood that users 171A-171D may each have any number of different biometric sensors.

In one example, mobile device 141 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities and may further have wired communication and networking capabilities. In one example, mobile device 141 may be associated with user 171A. In addition, in one example, biometric sensor 172A may not be equipped for cellular communications. However, biometric data of user 171A captured via biometric sensor 172A may still be conveyed to server 112 via wireless access network 115 by mobile device 141. For instance, biometric sensor 172A may have a wired or wireless connection (e.g., an IEEE 802.15 connection) to mobile device 141. In addition, mobile device 141 may be configured to forward the biometric data to server 112 using cellular communications via base station 117 and wireless access network 115.

In addition, relevant biometric data for users 171A-171D may also be gathered by server 112 and/or server 125 from other devices, such as mobile device 141, personal computers, televisions, other mobile devices of users 170B-170D (not shown), and so forth. For example, a personal computer may have an attached or integrated camera for obtaining facial image data of a viewer, and/or an attached or integrated microphone for recording voice(s) within recording range of the microphone. Thus, in one example, the computer may capture video or still images of the users' faces, gait, and so forth. Similarly, the computer may record audio data of users' voices from which pitch, tone, and other parameters may be calculated. Alternatively, or in addition, words and phrases in the audio data may also be determined, e.g., using speech recognition techniques. In another example, a keyboard of the computer may record forces of keystrokes, mobile device 141 and/or other mobile devices of users 170B-170D (not shown) may record forces of presses on touchscreens of the respective devices, and so forth.

In one example, the users 171A-171D have affirmatively granted permission (e.g., opting into the service with specific permission to allow the gathering and use of the users biometric data) to the telecommunication network 110 to gather biometric data regarding the respective users 171A-171D, to use the biometric data to determine acceptable ranges for various sensory services or individual tasks within a sensory service for individual users or groups of users, to share the biometric data and/or to determine acceptable ranges by the sensory service provider network 120, and so forth. In one example, sensory service provider network 120 may gather biometric data regarding the respective users 171A-171D from biometric sensors 172A-172D via wireless access points 194-196 but may forward the biometric data to server 112 via access network 118. For instance, biometric sensors 172A-172D may transmit the biometric data in an encrypted or encapsulated format that is undecipherable to the sensory service provider network 120, where the sensory service provider network 120 merely acts as a communication channel to forward the biometric data to server 112.

Server 112 may use biometric data received via sensory service provider network 120 alone or in conjunction with biometric data that is otherwise obtained to determine acceptable ranges for the sensory service, to aggregate the biometric data with respect to different groups of users, and so forth. Server 112 may return anonymized acceptable ranges for the sensory service, e.g., to server 125 in the sensory service provider network 120. Alternatively, or in addition, server 112 may provide actual biometric data for one or more of the users 171A-171D to server 125 in the sensory service provider network 120. However, it should be noted that the sharing of such biometric data is controlled by the server 112 deployed in the telecommunication network 110 in accordance with the permissions of the respective users 171A-171D. This centralized approach allows for greater control of the users' biometric data to ensure the privacy of the users are maintained.

In the example of FIG. 1 users 171A-171D may be at the start of the sensory service (e.g., the start of a ride 190). In one example, the server 125 may determine that users 171A-171D are at the start of the ride via detection of the biometric sensors 172A-172D via wireless access points 194-196. For instance, the biometric sensors 172A-172D may provide a Bluetooth discovery signal or a similar short-range wireless beacon signal that may identify the biometric sensors 172A-172D to listening devices. In one example, the server 125 does not obtain the actual identities of the users 171A-171D but may obtain anonymous user IDs, serial numbers, or the like, which may be used by server 125 to request an acceptable range for one or more biometric measurements and/or biometric data associated with users 171A-171D stored at server 112.

In one example, the server 125 may request a response from server 112 indicating whether users 171A-171D have biometric data that falls within an acceptable range for the ride 190. Alternatively, or in addition, the operator of ride 190 may prompt the users 171A-171D to engage in certain physical tasks, such as walking briskly toward a ride, climbing up a flight of stairs leading to the start of the ride, running a predefined distant, e.g., 20 meters, performing a number of pushups, e.g., 5 pushups, lifting a particular weight, jumping as high as possible, etc., where the biometric data will be captured during the performance of these physical tasks (e.g., a time to complete the run, a height of the jump, a heart rate during the pushups, a maximum number of repetitions moving the weight, etc.). The biometric measurements may then be captured, uploaded to server 112 via wireless access network 115 and/or via sensory service provider network 120, and used to qualify the users 171A-171D for the ride 190.

In one example, the server 125 may provide typical ranges or otherwise pre-calculated acceptable ranges for the ride 190 for one or more demographic groups of users/user categories to the server 112, along with a request to server 112 to assert whether the biometric data for users 171A-171D are within the acceptable range(s). It should again be noted that the biometric data may relate to historical biometric data or may include biometric data that may be captured just in advance of the ride 190, e.g., in response to a prompt from an operator of the ride 190. As just one example, an acceptable range may be that the users are to be able to lift at least 20 pounds overhead. For instance, a harness restraint on raft 183 may be 20 pounds, and the operator of ride 190 may determine that all riders should be able to lift the harness, e.g., in the event of an emergency requiring manual lifting of the 20 pound harness, or simply as a general condition for being able to board the raft 183. Thus, the biometric data of users 171A-171D may indicate that the users 171A-171D have each lifted 20 pounds successfully in advance of the ride or in the recent past, such that server 112 may assert to server 125 that the users 171A-171D meet the qualifications.

Alternatively, or in addition, the ride 190 may require paddling by the participants, and the operator would like that all participants are able to paddle without any substantial risk of a medical issue. For instance, the acceptable range may be a heartrate of no more than 130 beats-per-minute when engaging in moderate paddling for 3 minutes. The server 125 may thus submit this acceptable range to the server 112 along with identifications of the users 171A-171D and a request to assert whether the users 171A-171D are in compliance. For illustrative purposes, it is assumed that server 112 has biometric data regarding the users' heart rates in connection with moderate paddling activities. However, in another example, the request may relate to heartrate data for moderate exercise in general, without being confined to paddling activities.

In one example, it may be assumed that the biometric data for users 171A-171D indicates that the users' respective heart rates do not exceed 130 beats-per-minute for such type of activity. As such, server 112 may indicate to server 125 that the users 171A-171D are qualified for the sensory service of ride 190. It should be noted that in one example, the identities of the users 171A-171D and their actual heart rate data are not made available to server 125 or the sensory service provider network 120. Instead, only a "yes" or "no" qualification response may be provided for each user. Alternatively, or in addition, the server 112 may indicate a heart rate category, e.g., a range of heart rates for the users 171A-171D, which may be used by the server 125 to adjust and/or select an operating condition for one or more network-controllable physical resources, as described in greater detail below. Assuming that all users 171A-171D are qualified, the server 125 may then indicate to the users 171A-171D that the users 171A-171D are permitted to begin the ride 190 as a group.

However, in another example, where all of the users 171A-171D are not qualified, the server 125 may indicate to the users 171A-171D a suggested change to the group in response to receiving the declination. For instance, the server may suggest that one or more users who are not qualified may wish to skip the ride 190. In one example, the suggestion may be presented to a user via his or her mobile device, such as mobile device 141, rather than to the entire group of users 171A-171D. In still another example, the plurality of the users 171A-171D may be indicated by server 112 to be in a particular biometric range (e.g., a first heart rate category) whereas one or more others of the users 171A-171D may be in a another biometric range (e.g., a higher heart rate category). In addition, where the ride 190 is configured to provide a more intense experience for a lower heart rate category and a tamer experience for a higher heart rate category, the server 125 may suggest to the users 171A-171D to separate the group so as to allow some of the users 171A-171D to have a "higher service level," e.g., the more intense experience, which may be more entertaining and hence preferred by those users. The users 171A-171D may indicate an acceptance of the suggested change to the composition of the group in any number of ways, such as providing a response to a message presented via mobile device 141, by pressing a button on a touchscreen provided at the start of the ride 190 (not shown), and so on. Where the suggested change is declined, the server 125 may control the ride 190 to provide a "lower service level," e.g., the tamer experience by controlling one or more of the network-controllable physical resources 182-186 in accordance with the most restrictive biometric level among all of the users 171A-171D; in the present example, the user(s) in the highest heart rate category. Thus, the sensory service, ride 190, is tailored for the group of users 171A-171D based upon the service level in response to receiving the acceptance (or declination) of the suggested change.

Continuing with the present example, it is assumed that one or all of the users 171A-171D are permitted to begin the ride 190. As illustrated in FIG. 1, the raft 183 may start flowing down the main waterway 191 toward the waterfall 182. In one example, the server 125 may have selected a particular service level for the ride 190 in accordance with the biometric levels of the users 171A-171D that remain in the group for the ride 190. In one example, the service level (e.g., high intensity, medium intensity, low intensity, calm, etc.), may be associated with particular configurations for the various network-controllable physical resources 182-186. For instance, for a "high intensity" service level, the waterfall 182 may be controlled to provide a higher rate of water delivery than for the "medium intensity" and "low intensity" service levels. For a "calm" service level, the flow of water from waterfall 182 may be shut off completely. Similarly, the underwater barrier 184 may be raised higher to provide larger rapids or other higher turbulence in the main waterway 191 and lower to provide smaller rapids or other lower turbulence for the "medium intensity" and "low intensity" service levels.

In one example, the underwater barrier 184 may be raised completely to divert the raft 183 to the secondary waterway 192, which may be for the "high intensity" service level with even more turbulent water or other features. For a "calm" service level, the underwater barrier 184 may be lowered completely to provide no turbulence to the water. Similarly, the loudspeakers 185 and 186 may be controlled to play louder or more ominous music or "scarier" sounds for a "high intensity" service level, while a "calm" service level may be associated with loudspeakers 185 and 186 being turned off or providing relaxing, calming music. For "medium intensity" and "low intensity" service levels, intermediate auditory experiences may be provided by using intermediate sound levels, different music, etc. In any case, the server 125 may command the network-controllable physical resources 182-186 via communications through the sensory service provider network 120.

In one example, the server 125 may select a service level for the group of users at the beginning of the ride 190 and may command the network-controllable physical resources 182-186 accordingly. However, in one example, the biometric data of the users 171A-171D who are on the ride 190 may continue to be monitored during the course of the ride 190. In one example, the biometric data may be transmitted to server 112 by biometric sensors 171A-171D and/or mobile device 141 via base station 117 and the wireless access network 115. Alternatively, or in addition, the biometric data may be transmitted to server 112 by biometric sensors 171A-171D and/or mobile device 141 via wireless access points 194-196. For instance, the wireless access points 194-196 may be stationed throughout the ride 190 so that at least one of the wireless access points 194-196 is within communication range of the biometric sensors or endpoint devices of the participants who are at various points along the ride 190. In one example, server 112 may continue to monitor the biometric data of the users 171A-171D on the ride 190 to determine that the users 171A-171D remain within the acceptable range(s) for the biometric data at all times during the ride 190. For instance, although biometric data for user 171C at the start of ride 190 may appear to indicate that the user 171C was similar to other users of the group who have had no problems with ride 190 at the "high intensity" service level, user 171C may nevertheless have a spike in his or her heart rate after the waterfall 182 which would push the user 171C out of an acceptable range associated with the service level selected at the beginning of the ride 190 (e.g., the "high intensity" service level).

In one example, server 112 may detect this condition and may notify server 125. It should be noted that the notification may not identify user 171C specifically, but may more generally indicate that one of the users 171A-171D who is on the raft 183 may be out of compliance. In such case, server 125 may then select one or more settings for one or more of the remaining network-controllable physical resources 182-186 in the ride to be associated with a "lower" service level, e.g., a less intense experience than the current service level. For instance, the underwater barrier 184 may be lowered to a lower angle setting associated with a "medium intensity" service level (e.g., smaller rapids, less turbulence) versus a higher angle setting associated with the "high intensity" service level (e.g., larger rapids, greater turbulence), in an effort to reduce the heart rate of user 171C or to prevent the heart rate from continuing to climb. In one example, the biometric data of users 171A-171D on the raft 183 (and in particular user 171C) may continue to be monitored by server 112 and/or server 125 to determine whether the adjustment to the network-controllable physical resources 182-186 has the intended effect on the heart rate of user 171C. If yes, the ride 190 may continue at the reduced service level. If no, the server 125 may further reduce the service level by making adjustments to the settings of the remaining network-controllable physical resources 182-186 along the ride, turning off the various network-controllable physical resources 182-186, or adjust the settings of the network-controllable physical resources 182-186 to otherwise cause the raft 183 to finish the ride 190 as quickly as possible, e.g., diverting the raft to a bypass route and the like.

In one example, the server 112 may also monitor the biometric data of the users 171A-171D on the ride 190 to determine that the users 171A-171D remain within acceptable biometric range(s) that are personal to the respective users. For instance, user 171C may experience a heart arrhythmia during the ride 190, and while the heart rate may remain in compliance with the acceptable range associated with the ride 190 and the selected service level, if server 112 detects the arrhythmia and sends notification to server 125 of the potential medical issue, the server 125 may adjust the network-controllable physical resources 182-186 to "calm" settings, "off" settings, etc., may select settings for the network-controllable physical resources 182-186 to cause the raft 183 to end the ride 190 sooner, and so forth. In addition, the server 112 may continue to collect biometric data of users 171A-171D on the ride 190 to update the acceptable ranges of biometric data for the ride 190, to adjust the acceptable ranges associated with various service levels (e.g., different intensities of experience for the ride 190), or to provide aggregated biometric data of users 171A-171D on the ride 190 to server 125 to recalculate the acceptable ranges or to adjust the acceptable ranges associated with various service levels, and so forth.

It should be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server 112 may alternatively or additionally be performed by server 125, and vice versa. In addition, although a single server 112 is illustrated in the example of FIG. 1, in other, further, and different examples, the same or similar functions may be distributed among multiple devices within the telecommunication network 110 that may collectively provide various services in connection with examples of the present disclosure for adjusting a network-controllable physical resource of a sensory service in response to biometric data for a group of users. Similarly, the functions of server 125 may be distributed among multiple devices within the sensory service provider network 120 that may collectively perform operations for adjusting a network-controllable physical resource of a sensory service in response to biometric data for a group of users, in accordance with the present disclosure. In addition, the ride 190 is provided as just one illustrative example of a sensory service that may relate to examples of the present disclosure. Accordingly, in other, further, and different examples, ride 190 may alternatively comprise a roller coaster, a waterslide, an obstacle course, and so forth. Thus, these and other modifications are all contemplated within the scope of the present disclosure.

Figure 2:
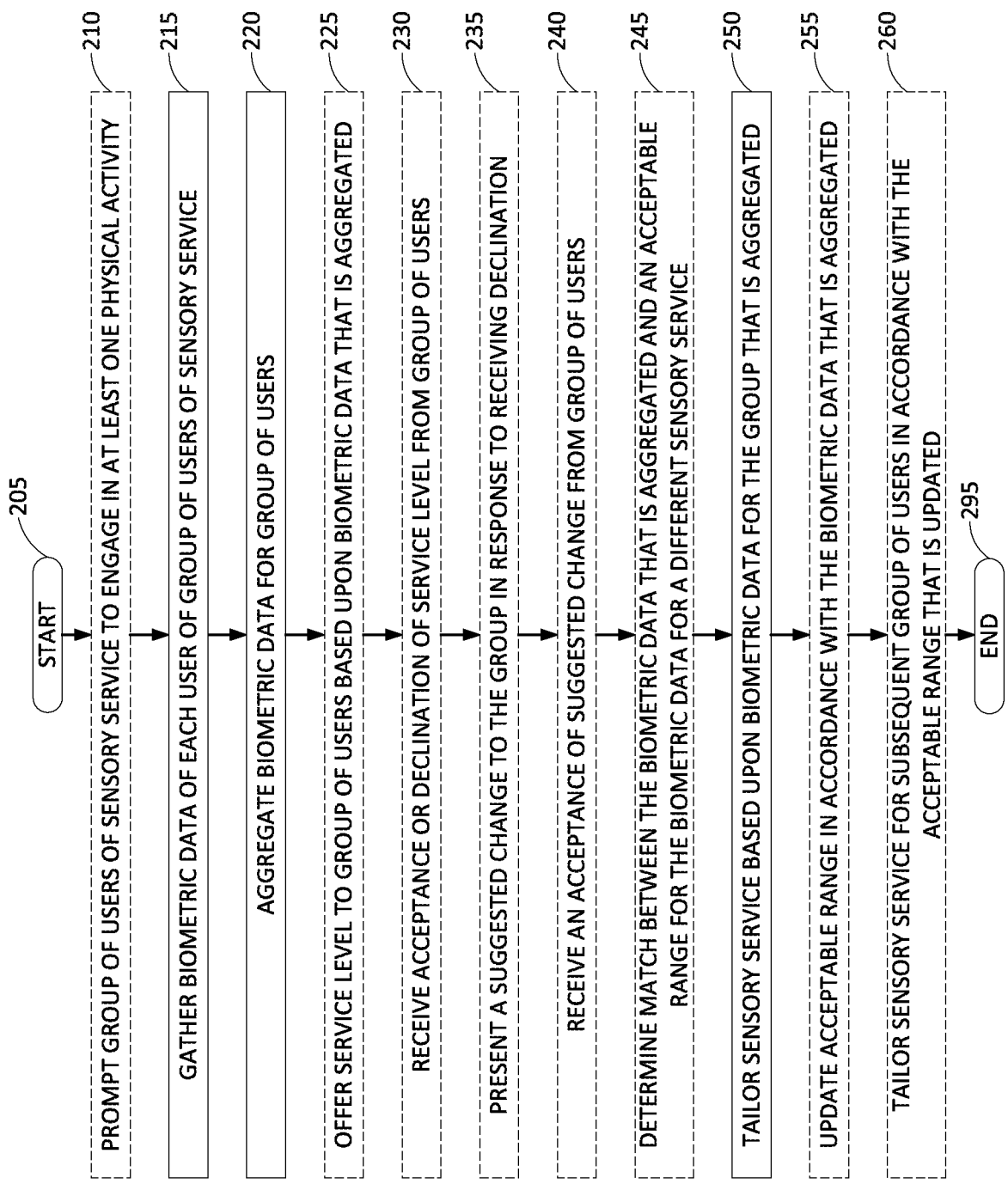
FIG. 2 illustrates a flowchart of an example method for adjusting a network-controllable physical resource of a sensory service in response to biometric data for a group of users.

FIG. 2 illustrates a flowchart of an example method 200 for adjusting a network-controllable physical resource of a sensory service in response to biometric data for a group of users. In one example, steps, functions and/or operations of the method 200 may be performed by a device as illustrated in FIG. 1, e.g., by one of server 112 and/or server 125, or any one or more components thereof, such as a processing system. Alternatively, or in addition, the steps, functions and/or operations of the method 200 may be performed by a processing system collectively comprising a plurality of devices as illustrated in FIG. 1, such as server 112, server 125, biometric sensors 172A-172D, mobile device 141, wireless access points 194-196, network-controllable physical resources 182-186, and so forth. In one example, the steps, functions, or operations of method 200 may be performed by a computing device or system 300, and/or a processing system 302 as described in connection with FIG. 3 below. For instance, the computing device 300 may represent at least a portion of a server, a mobile device, a biometric sensor, and so forth in accordance with the present disclosure. For illustrative purposes, the method 200 is described in greater detail below in connection with an example performed by a processing system, such as processing system 302. The method 200 begins in step 205 and may proceed to optional step 210 or to step 215.

At optional step 210, the processing system may prompt a group of users to engage in at least one physical activity. For instance, the group of users may be at the beginning of a sensory service, such as an entertainment ride, and the operator may wish to test the users to determine if the users are eligible to participate in the ride based at least in part upon their biometric data during the at least one physical activity. Similarly, the operator may wish to determine a service level for the group of users based at least in part upon their biometric data during the at least one physical activity. The sensory service may comprise at least one network-controllable physical resource as described herein.

At step 215, the processing system gathers biometric data of each user of the group of users of the sensory service. In one example, the biometric data for each user is gathered during the at least one physical activity that may be prompted at optional step 210. In one example, the biometric data of each user may alternatively or additionally comprise historical biometric data. In one example, the biometric data of each user may alternatively or additionally be gathered during the sensory service. For instance, the method 200 may be performed while a ride or other sensory services are already underway. In one example, the biometric data is gathered from a network-based device. For instance, the processing system may comprise a processing system of a sensory service provider, and a telecommunication service provider or other entities may store the biometric data on behalf of users and respond to queries for biometric data from one or more sensory service provider systems. In one example, the network-based device obtains the biometric data for each user of the group of users from a wearable biometric device of a plurality of wearable biometric devices of the group of users, such as heart rate monitors, electrocardiogram devices, acoustic sensors, sensors for measuring users' breathing rates, galvanic skin response devices, and so forth. For historical biometric data, the users' biometric data may also be gathered from various devices in a network, such as the users' mobile devices, via personal computers, via smart TVs, and so forth. The biometric data may include various physical parameters of the first user and the second user, such as: facial image data, heart rates, breathing rates, skin conductance and/or sweat/skin moisture levels, temperature, voice pitch and tone, blood pressure, body movement information, postures, brain activity, e.g., electrical activity, optical activity, and/or chemical activity, and so forth.

At step 220, the processing system aggregates the biometric data for the group of users. For instance, the processing system may determine the "lowest common denominator" among all of the users for a particular aspect, or aspects of the biometric data. In one example, step 220 may include placing the users into different categories with respect to aspects of the biometric data. Alternatively, or in addition, step 220 may include associating the users with different service categories for the sensory service based upon the biometric data. In addition, in one example, step 220 may include identifying a service level for the sensory service based upon a lowest service level category that is determined for any one of the users in the group of users. For instance, several of the users in the group may be elite athletes with biometric data that indicates that these individuals may be eligible for a highest service level for the sensory service (e.g., a "high intensity" experience). However, the users may also include the elite athletes' children who may have biometric data which individually indicates the children are associated with a lower service level (e.g., "medium intensity") for the sensory service. Thus, the processing system may determine that for the overall group, the service level should be "medium intensity." It should be noted that the terms "high," "medium," and "low" are relative terms and are used here to simply provide various levels of granularity for tailoring the sensory service. Any number of levels of granularity are within the scope of the present disclosure.

At optional step 225, the processing system may offer a service level for the sensory service to the group of users based upon the biometric data that is aggregated. For instance, as described above, the processing system may determine that for the overall group, the service level should be "medium intensity" based upon the biometric data for at least one of the users indicating that the higher intensity level is not appropriate. However, in one example, the group of users may be given a choice to proceed at the service level that is determined in this way.

At optional step 230, the processing system receives an acceptance or a declination of the service level from the group of users. If the offer is accepted, the method 200 may proceed to step 250. Otherwise, the method 200 may proceed to optional step 235.

At optional step 235, the processing system may present to the group of users a suggested change to the group in response to receiving a declination at optional step 230. For instance, the processing system may suggest to the group of users to separate out the users qualifying for the higher service level. In one example, the suggestion may be presented to a mobile device of a user qualifying for the lower/lowest service level (the one that is offered at optional step 230). In one example, the suggestion may be presented via a device with a user interface (such as a touchscreen device) placed in the environment of the sensory service and coupled to the processing system, e.g., a display on a ride indicating a participant situated at a particular seat of the ride to move to a different group and so on.

At optional step 240, the processing system receives an acceptance of the suggested change from the group of users. It should be noted that the acceptance may come from the group collectively or through a representative of the group, or may come from one or more individual users who may be contacted separately with the suggested change at optional step 235. For instance, these users may be invited to skip the sensory service to allow others in the group to have a higher level of service, e.g., a more intense sensory service.

At optional step 245, the processing system determines a match between the biometric data that is aggregated at step 220 and an acceptable range for the biometric data for a different sensory service. For example, the sensory service may be a new service where acceptable ranges for biometric data are not yet available. In such case, step 215 may include gathering biometric data of the users in the group after the sensory service has begun and optional step 245 may comprise determining a match between the biometric data that is aggregated at step 220 and the acceptable range for the biometric data for the different sensory service when a threshold level of similarity is detected. For example, similar gait patterns, heart rate patterns, breathing rates, and so forth may be detected to indicate that the present sensory service may be analogous to another sensory service for which an acceptable range, or ranges of biometric data, and/or acceptable range(s) for different categories/service levels are known.

At step 250 the processing system tailors the sensory service for the group of users based upon the biometric data for the group of users that is aggregated. In one example, the tailoring of the sensory service comprises adjusting the at least one network-controllable physical resource in response to the biometric data for the group of users. The network-controllable physical resource may comprise at least one of: a visual source, an audio source, a tactile source, or an olfactory source.

In one example, the sensory service is tailored for the group of users based upon the service level offering in response to receiving the acceptance at optional step 230. For example, the users may agree to the service level offering that is based upon the lowest common denominator, e.g., the most restrictive biometric level among all of the users; such as the user(s) in the highest heart rate category, the lowest weight lift category, the longest running time category, the highest breathing rate category, etc. It should be noted that the terms "highest" and "lowest" do not necessarily denote the highest or lowest categories that are available to the processing system, but rather the highest or lowest categories as pertains to the users in the group. In one example, the sensory service is tailored for the group of users based upon the service level in response to receiving the acceptance of the suggested change at optional step 240. For instance, a more intense sensory service may be provided when users associated with lesser service categories agree to skip the sensory service or exit the group.

In one example, the biometric data of each user is gathered during the sensory service at step 215, and the tailoring the sensory service for the group of users may comprise at least one of: providing a more intense sensory service when the biometric data for the entire group is within a predetermined permissible range, or providing a less intense sensory service when for at least one user in the group of users, the biometric data for the at least one user exceeds the predetermined permissible range. In one example, the predetermined permissible range may comprise the acceptable range, e.g., for a current service level. Alternatively, or in addition, the predetermined permissible range may be personal to each of the users in the group.

In one example, the more intense sensory service comprises an addition to the sensory service of the at least one network-controllable physical resource, e.g., where the at least one network-controllable physical resource is associated with a stress increase as indicated by the biometric data. For instance, the network-controllable physical resource may comprise a waterfall or water cannon to soak riders on a ride. In one example, the more intense sensory service comprises an increase to an output intensity, e.g., a higher audio volume, a greater volume of water, brighter lighting, etc. Similarly, in one example, a ride may have two options of: a steeper drop off and a less steep drop off, and the network-controllable physical resource may divert a ride to the steeper drop off. In one example, a less intense sensory service comprises a removal or an omission of the at least one network-controllable physical resource, e.g., where the at least one network-controllable physical resource is associated with a stress decrease as indicated by the biometric data. For instance, a water cannon or waterfall may be turned off, loudspeakers may be turned off or made quieter, and so forth. In one example, the sensory service is further tailored for the group of users at step 250 by setting an acceptable range for the biometric data for the sensory service in accordance with the acceptable range for the biometric data for a slightly different sensory service that may be matched at optional step 245. In one example, the processing system selects an intermediate service level as a default service level, and then adjusts the service level up or down, depending upon the aggregated biometric data of the group of users.

At optional step 255, the processing system may update the acceptable range for the biometric data for the sensory service in accordance with the biometric data that is aggregated at step 220. For instance, as described above, the sensory service may be a new service where acceptable range(s) for biometric data are not yet available. Thus, an acceptable range, or ranges, for the biometric data may initially be borrowed from a similar sensory service. However, as users begin participating in the new sensory service and the users' biometric data is gathered and aggregated during the course of the sensory service, the acceptable range(s) may be adapted to account for the actual measured biometric data of the users while engaged in the sensor service.

At optional step 260, the processing system may tailor the sensory service for a subsequent group of users in accordance with at least one acceptable range for the biometric data for the sensory service that is updated. For instance, as stated above as users begin participating in a new sensory service and the users' biometric data is gathered and aggregated during the course of the sensory service, the acceptable range(s) initially borrowed from a similar sensory service may be adapted to account for the actual measured biometric data of the users while engaged in the sensor service. In one example, the sensory service is further tailored for the subsequent group of users based upon biometric data for each user of the subsequent group of users. In particular, the users in the subsequent group of users may be associated with different service levels in accordance with the biometric data of the subsequent group of users, the at least one network-controllable physical resource may be adjusted to various settings in accordance with such service levels and/or the measured biometric data of the subsequent group of users during the sensory service, and so forth.

Following step 250 or one of optional steps 255-260, the method 200 proceeds to step 295. At step 295, the method 200 ends.

It should be noted that the method 200 may be expanded to include additional steps or may be modified to include additional operations with respect to the steps outlined above. For instance, the method 200 may be repeated through various cycles of user groups participating in a sensory service. In one example, the method 200 may be expanded to include determining an effectiveness of a change to one or more network-controllable physical resources, e.g., to cause a change to one or more users' biometric data to a more restrictive biometric level (e.g., a safer biometric level), further changing the setting(s) of one or more network-controllable physical resources, stopping the sensory service, or ending the sensory service early, if not effective, and so forth. Thus, these and other modifications are all contemplated within the scope of the present disclosure.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for adjusting a network-controllable physical resource of a sensory service in response to biometric data for a group of users and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for adjusting a network-controllable physical resource of a sensory service in response to biometric data for a group of users (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for adjusting a network-controllable physical resource of a sensory service in response to biometric data for a group of users (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method of operating an entertainment ride, the method comprising:

prompting, by a processor, each user of a group of users of the entertainment ride to engage in at least one physical activity, wherein the entertainment ride comprises at least one network-controllable physical resource and a plurality of service levels;

gathering, by the processor, biometric data of each user of the group of users, wherein the biometric data for each user of the group of users is gathered during an execution of the at least one physical activity;

aggregating, by the processor, the biometric data for the group of users;

offering, by the processor, a service level of the plurality of service levels for the entertainment ride to the group of users based upon the biometric data that is aggregated;

receiving, by the processor, a declination of the service level from the group of users;

in response to the receiving the declination, presenting, by the processor, to one or more users of the group of users a suggestion to change who is included in the group of users to form a modified group of users of the entertainment ride;

continually gathering, by the processor, biometric data of each user of the modified group of users during operation of the entertainment ride; and tailoring, by the processor, the entertainment ride for the modified group of users based upon the service level, wherein the tailoring of the entertainment ride comprises adjusting the at least one network-controllable physical resource of the entertainment ride in accordance with biometric data gathered for the modified group of users, wherein the adjusting comprises at least one:
  (a) providing, by the at least one network-controllable physical resource, a more physically intense level of the entertainment ride when, for each user of the modified group of users, the biometric data is within a predetermined permissible range; or
  (b) providing, by the at least one network-controllable physical resource, a less physically intense level of the entertainment ride when, for at least one user in the modified group of users, the biometric data exceeds the predetermined permissible range.

2. The method of claim 1, further comprising:
offering a different service level of the plurality of service levels for the entertainment ride to the modified group of users based upon biometric data that is aggregated for the modified group of users; and
receiving an acceptance of the different service level from the modified group of users, wherein the entertainment ride is tailored for the modified group of users based upon the acceptance of the different service level that is offered.

3. The method of claim 1, further comprising:
receiving an acceptance of the suggestion to change which users are members of the group of users from one or more users of the group of users, wherein the entertainment ride is tailored for the modified group of users based upon the acceptance of the suggestion.

4. The method of claim 1, further comprising:
determining a match between the biometric data that is aggregated for the modified group of users and an acceptable range of biometric data for a different entertainment ride, wherein the entertainment ride is tailored based upon the acceptable range of biometric data for the different entertainment ride.

5. The method of claim 4, wherein the match is determined between the biometric data that is aggregated for the modified group of users and the acceptable range of biometric data for the different entertainment ride when a threshold level of similarity is detected.

6. The method of claim 4, wherein the entertainment ride is further tailored for the modified group of users by setting an acceptable range of biometric data for the entertainment ride in accordance with the acceptable range of biometric data for the different entertainment ride sensory service.

7. The method of claim 6, further comprising:
updating the acceptable range of biometric data for the entertainment ride in accordance with the biometric data that is aggregated for the modified group of users; and
tailoring the entertainment ride for a subsequent group of users in accordance with the acceptable range of biometric data that is updated for the entertainment ride.

8. The method of claim 7, wherein the entertainment ride is further tailored for the subsequent group of users based upon biometric data collected for each user of the subsequent group of users.

9. The method of claim 1, wherein the at least one network-controllable physical resource comprises at least one of:
  a visual source;
  an audio source;
  a tactile source; or
  an olfactory source.

10. The method of claim 1, wherein the more physically intense level of the entertainment ride comprises an addition to the entertainment ride of the at least one network-controllable physical resource, wherein the at least one network-controllable physical resource is associated with a stress increase as indicated by the biometric data.

11. The method of claim 1, wherein the more physically intense level of the entertainment ride comprises an increase to an output intensity of the at least one network-controllable physical resource.

12. The method of claim 1, wherein the less physically intense level of the entertainment ride comprises a removal or an omission of the at least one network-controllable physical resource, wherein the at least one network-controllable physical resource is associated with a stress decrease as indicated by the biometric data.

13. A non-transitory computer-readable medium storing instructions which, when executed by a processing system including at least one processor, cause the processing system to perform operations for use in operating an entertainment ride, the operations comprising:
  prompting each user of a group of users of the entertainment ride a to engage in at least one physical activity, wherein the entertainment ride comprises at least one network-controllable physical resource and a plurality of service levels;
  gathering biometric data of each user of the group of users, wherein the biometric data for each user of the group of users is gathered during an execution of the at least one physical activity;
  aggregating the biometric data for the group of users;
  offering a service level of the plurality of service levels for the entertainment ride to the group of users based upon the biometric data that is aggregated;
  receiving a declination of the service level from the group of users;
  in response to receiving the declination, presenting to one or more users of the group of users a suggestion to change who is included in the group of users to form a modified group of users of the entertainment ride;
  continually gathering biometric data of each user of the modified group of users during operation of the entertainment ride; and
  tailoring the entertainment ride for the modified group of users based upon the service level, wherein the tailoring of the entertainment ride sensory comprises adjusting the at least one network-controllable physical resource of the entertainment ride in accordance with biometric data gathered for the modified group of users, wherein the adjusting comprises at least one of:
- (a) providing, by the at least one network-controllable physical resource, a more physically intense level of the entertainment ride when, for each user of the modified group of users, the biometric data is within a predetermined permissible range; or
- (b) providing, by the at least one network-controllable physical resource, a less physically intense level of the entertainment ride when, for at least one user in the modified group of users, the biometric data exceeds the predetermined permissible range.

14. An entertainment ride, the entertainment ride comprising:
a processing system including at least one processor; and
a computer-readable medium storing instructions which, when executed by the processing system, cause the processing system of the entertainment ride to perform operations, the operations comprising:
prompting each user of a group of users of the entertainment ride to engage in at least one physical activity, wherein the entertainment ride comprises at least one network-controllable physical resource and a plurality of service levels;
gathering biometric data of each user of the group of users, wherein the biometric data for each user of the group of users is gathered during an execution of the at least one physical activity;
aggregating the biometric data for the group of users;
offering a service level of the plurality of service levels for the entertainment ride to the group of users based upon the biometric data that is aggregated;
receiving a declination of the service level from the group of users;
in response to receiving the declination, presenting to one or more users of the group of users a suggestion to change who is included in the group of users to form a modified group of users of the entertainment ride;
continually gathering biometric data of each user of the modified group of users during operation of the entertainment ride; and
tailoring the entertainment ride for the modified group of users based upon the service level, wherein the tailoring of the entertainment ride comprises adjusting the at least one network-controllable physical resource of the entertainment ride in accordance with biometric data gathered for the modified group of users, wherein the adjusting comprises at least one of:
- (a) providing, by the at least one network-controllable physical resource, a more physically intense level of the entertainment ride when, for each user of the modified group of users, the biometric data is within a predetermined permissible range; or
- (b) providing, by the at least one network-controllable physical resource, a less physically intense level of the entertainment ride when, for at least one user in the modified group of users, the biometric data exceeds the predetermined permissible range.

15. The non-transitory computer readable medium of claim 13 wherein the operations further comprise:
offering a different service level of the plurality of service levels for the entertainment ride to the modified group of users based upon biometric data that is aggregated for the modified group of users; and
receiving an acceptance of the different service level from the modified group of users, wherein the entertainment ride is tailored for the modified group of users based upon the acceptance of the different service level that is offered.

16. The method of claim 1 further comprising:
offering a different service level of the plurality of service levels for the entertainment ride to the modified group of users based upon biometric data that is aggregated for the modified group of users; and
receiving an acceptance of the different service level from the modified group of users, wherein the entertainment ride is tailored for the modified group of users based upon the acceptance of the different service level that is offered.

17. The non-transitory computer-readable medium of claim 13 wherein the operations further comprise:
offering a different service level of the plurality of service levels for the entertainment ride to the modified group of users based upon biometric data that is aggregated for the modified group of users; and
receiving an acceptance of the different service level from the modified group of users, wherein the entertainment ride is tailored for the modified group of users based upon the acceptance of the different service level that is offered.

18. The entertainment ride of claim 14 wherein the operations further comprise:
offering a different service level of the plurality of service levels for the entertainment ride to the modified group of users based upon biometric data that is aggregated for the modified group of users; and
receiving an acceptance of the different service level from the modified group of users, wherein the entertainment ride is tailored for the modified group of users based upon the acceptance of the different service level that is offered.

19. The non-transitory computer-readable medium of claim of claim 13, wherein the at least one network-controllable physical resource comprises at least one of:
a visual source;
an audio source;
a tactile source; or
an olfactory source.

20. The entertainment ride of claim 14, wherein the at least one network-controllable physical resource comprises at least one of:
a visual source;
an audio source;
a tactile source; or
an olfactory source.

* * * * *